(12) United States Patent
Veilleux, Jr. et al.

(10) Patent No.: US 12,365,479 B2
(45) Date of Patent: Jul. 22, 2025

(54) STOWABLE ELECTRIC-HYBRID PROPFAN

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 414 days.

(21) Appl. No.: 17/738,543

(22) Filed: May 6, 2022

(65) Prior Publication Data

US 2023/0358191 A1 Nov. 9, 2023

(51) Int. Cl.
| | |
|---|---|
| *F02K 7/10* | (2006.01) |
| *B64D 27/10* | (2006.01) |
| *B64D 27/24* | (2024.01) |
| *B64D 31/00* | (2024.01) |
| *B64D 27/02* | (2006.01) |

(52) U.S. Cl.
CPC .............. *F02K 7/10* (2013.01); *B64D 27/10* (2013.01); *B64D 27/24* (2013.01); *B64D 31/00* (2013.01); *B64D 27/026* (2024.01); *F05D 2220/34* (2013.01); *F05D 2220/76* (2013.01)

(58) Field of Classification Search
CPC ........... F02K 7/10; B64D 27/10; B64D 27/24; B64D 31/00; B64D 27/026; B64D 2041/002; B64D 41/007; F05D 2220/34; F05D 2220/76
See application file for complete search history.

(56) References Cited

U.S. PATENT DOCUMENTS

| | | | |
|---|---|---|---|
| 7,549,604 B2 | 6/2009 | Hutterer | |
| 8,708,275 B2 | 4/2014 | Belleville | |
| 9,132,922 B2 * | 9/2015 | Justak | ........................ F03D 1/04 |
| 10,227,138 B2 | 3/2019 | De Magalhaes Gomes | |
| (Continued) | | | |

FOREIGN PATENT DOCUMENTS

| | | | | |
|---|---|---|---|---|
| EP | 3228544 A1 | 10/2017 | | |
| FR | 3110896 A1 * | 12/2021 | ............. | B64D 27/24 |
| (Continued) | | | | |

OTHER PUBLICATIONS

Search Report issued in European Patent Application No. 23171953.5; Application Filing Date May 5, 2023; Date of Mailing Sep. 18, 2023 (8 pages).

*Primary Examiner* — Peter D Nolan
*Assistant Examiner* — Demetra R Smith-Stewart
(74) *Attorney, Agent, or Firm* — CANTOR COLBURN LLP

(57) ABSTRACT

An electricity generation and propulsion system of an aircraft is provided. The electricity generation and propulsion system includes a fuselage, a hybrid-electric power generation system operably disposed in the fuselage and a ram air turbine (RAT) device. The RAT device is coupled with the hybrid-electric power generation system and is stowable in the fuselage and deployable to an exterior of the fuselage. The RAT device is operable as a RAT when deployed into an airstream that drives rotations of the RAT from which the hybrid-electric power generation system generates electricity, and the RAT device is operable as a propulsor when deployed and driven by the hybrid-electric power generation system.

20 Claims, 4 Drawing Sheets

(56) References Cited

U.S. PATENT DOCUMENTS

| | | | |
|---|---|---|---|
| 11,878,812 B2* | 1/2024 | Schenk | H02K 1/2783 |
| 2006/0260323 A1* | 11/2006 | Moulebhar | F02C 6/08 |
| | | | 60/793 |
| 2011/0198918 A1* | 8/2011 | Langlois | F03D 9/12 |
| | | | 290/43 |
| 2015/0183523 A1 | 7/2015 | Himmelmann et al. | |
| 2015/0307201 A1* | 10/2015 | Criado | B64D 41/00 |
| | | | 244/58 |
| 2018/0265213 A1* | 9/2018 | Himmelmann | B64C 13/50 |
| 2018/0370644 A1 | 12/2018 | Coat et al. | |
| 2020/0079513 A1* | 3/2020 | Pastouchenko | F02C 6/14 |
| 2021/0291964 A1 | 9/2021 | Gilbert | |
| 2021/0391727 A1* | 12/2021 | Devautour | H02J 1/102 |
| 2023/0271717 A1* | 8/2023 | Rewerts | B64C 3/14 |
| | | | 244/13 |

FOREIGN PATENT DOCUMENTS

| | | | | |
|---|---|---|---|---|
| GB | 2461057 A | 12/2009 | | |
| WO | WO-2022093452 A2 * | 5/2022 | | B64C 1/20 |

* cited by examiner

STOWABLE ELECTRIC-HYBRID PROPFAN

BACKGROUND

The following description relates to an electric-hybrid propfan and, more specifically, to an electric-hybrid propeller fan that is stowable in an aircraft.

Modern "more-electric aircraft/engine" (MEA/MEE) architectures need advanced hybrid electric propulsion and electric power generation capabilities to meet the ever-increasing on-board electric power demand.

During an emergency event (e.g., main/auxiliary power-loss), a ram air turbine (RAT) can be deployed into a free airstream below an aircraft's fuselage. The RAT generates power from the airstream by ram pressure recovery due to the forward speed of the aircraft. The power generated by the RAT can be used to generate electricity to support vital on-board systems, such as flight controls, hydraulics, flight-critical instrumentation, communications, etc. Some RATs produce only hydraulic power but most modern RATs are coupled to an efficient compact electric generator. The power output of a typical RAT is about 50 kW. Increased power output is possible with larger RAT blades diameter, increased number of blades, optimized blades airfoils cross-sections, etc.

Due to the intermittent use of a RAT, such as during rare events like emergency power-loss, and a desire to optimize the RAT's size and weight envelope, the RAT may not be optimized for modern and future MEA electric power on-board needs during an emergency.

BRIEF DESCRIPTION

According to an aspect of the disclosure, an electricity generation and propulsion system of an aircraft is provided. The electricity generation and propulsion system includes a fuselage, a hybrid-electric power generation system operably disposed in the fuselage and a ram air turbine (RAT) device. The RAT device is coupled with the hybrid-electric power generation system and is stowable in the fuselage and deployable to an exterior of the fuselage. The RAT device is operable as a RAT when deployed into an airstream that drives rotations of the RAT from which the hybrid-electric power generation system generates electricity, and the RAT device is operable as a propulsor when deployed and driven by the hybrid-electric power generation system.

In accordance with additional or alternative embodiments, the RAT device is deployed during a power-loss event to be operable as the RAT.

In accordance with additional or alternative embodiments, the RAT device is deployed during take-off or an engine power-loss event to be operable as a forward thrust generating propulsor.

In accordance with additional or alternative embodiments, the RAT device is deployed during landing to be operable as a braking thrust generating propulsor.

In accordance with additional or alternative embodiments, the hybrid-electric power generation system is provided as an auxiliary power unit in a tail end of the fuselage.

In accordance with additional or alternative embodiments, the hybrid-electric power generation system includes first and second drive shafts, a gas turbine engine disposed on the first drive shaft, a motor-generator disposed on the first drive shaft, a power turbine, which is receptive of exhaust from the gas turbine engine and an electric generator, which is drivable by the power turbine via the second drive shaft.

In accordance with additional or alternative embodiments, the hybrid-electric power generation system further includes an alternating current (AC)/AC converter electrically interposed between the motor-generator and the electric generator and a converter, a battery and an inverter in parallel with the AC/AC converter and electrically interposed between the motor-generator and the electric generator.

In accordance with additional or alternative embodiments, the RAT device includes first and second RAT devices at starboard and port sides of the fuselage, respectively, first and second retracting pylons by which the first and second RAT devices are selectively deployable, respectively, from respective stowed positions and first and second power cables by which the hybrid-electric power generation system is electrically connected to the first and second RAT devices, respectively.

In accordance with additional or alternative embodiments, each of the first and second RAT devices includes a propfan having blades with swept profiles.

In accordance with additional or alternative embodiments, each of the first and second RAT devices is operable in a forward rotational direction to generate forward propulsor thrust.

In accordance with additional or alternative embodiments, each of the first and second RAT devices is operable in a reverse pitch angle to generate braking propulsor thrust.

According to an aspect of the disclosure, a method of operating an electricity generation and propulsion system of an aircraft is provided. The method includes ascertaining a current flight regime and a current condition of the aircraft, determining whether to deploy a RAT device in accordance with at least one of the current flight regime and the current condition of the aircraft, deploying the RAT device based on a result of the determining, judging whether to operate the RAT device, upon deployment, as one of a RAT and a propulsor in accordance with at least one of the current flight regime and the current condition of the aircraft and operating the RAT device as the one of the RAT and the propulsor based on a result of the judging.

In accordance with additional or alternative embodiments, the RAT device is electrically connected with a hybrid-electric power generation system of the aircraft.

In accordance with additional or alternative embodiments, the RAT device includes first and second RAT devices at starboard and port sides of the aircraft, respectively.

In accordance with additional or alternative embodiments, the method further includes stowing the RAT device in an aircraft fuselage and deploying the RAT device from the aircraft fuselage to an exterior of the aircraft fuselage.

In accordance with additional or alternative embodiments, the result of the determining is affirmative in an event the current condition of the aircraft is a power-loss event and the result of the judging is that the operating includes operating the RAT device as the RAT, upon deployment, during the power-loss event.

In accordance with additional or alternative embodiments, the result of the determining is affirmative in an event the current flight regime of the aircraft is take-off or in an event the current condition of the aircraft is an engine power-loss event and the result of the judging is that the operating includes operating the RAT device as a forward thrust generating propulsor, upon deployment, during the take-off or the engine power-loss event.

In accordance with additional or alternative embodiments, the result of the determining is affirmative in an event the current flight regime of the aircraft is landing and the result of the judging is that the operating includes operating the RAT device as a braking thrust generating propulsor, upon deployment, during the landing.

According to an aspect of the disclosure, an aircraft is provided and includes on-wing engine assemblies having an absence of thrust-reversers, a fuselage, a hybrid-electric power generation system operably disposed in the fuselage and ram air turbine (RAT) devices, which are each coupled with the hybrid-electric power generation system, and which are each stowable in the fuselage and deployable to an exterior of the fuselage. The RAT devices are each operable as a braking thrust generating propulsor when deployed during a landing and driven by the hybrid-electric power generation system.

In accordance with additional or alternative embodiments, the RAT devices are each operable as a RAT when deployed into an airstream that drives rotations of the RAT from which the hybrid-electric power generation system generates electricity and the RAT devices are each operable as a forward thrust generating propulsor when deployed during take-off or during an engine power-loss event and driven by the hybrid-electric power generation system.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

Figure 1A:
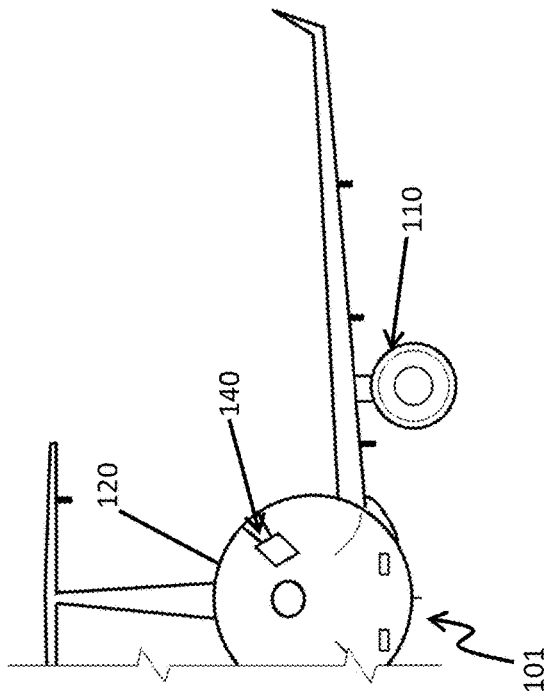
FIG. 1A is a rear view of an aircraft with a deployed RAT device in accordance with embodiments.
Figure 1B:
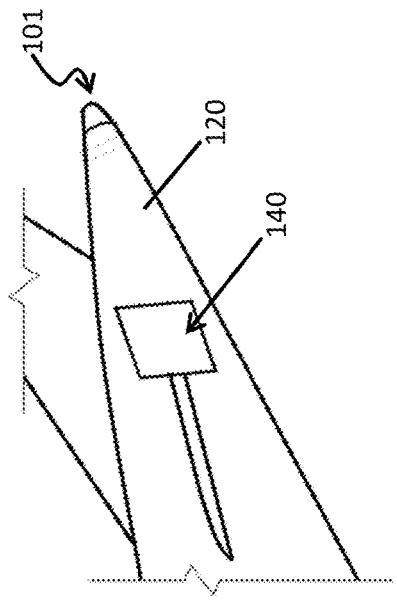
FIG. 1B is a side view of the aircraft of FIG. 1A with the deployed RAT device in accordance with embodiments.
Figure 2A:
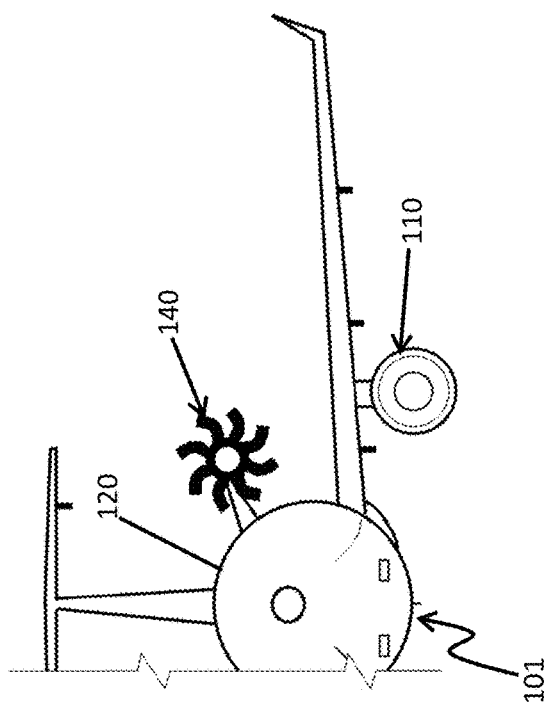
FIG. 2A is a rear view of an aircraft with a stowed RAT device in accordance with embodiments.
Figure 2B:
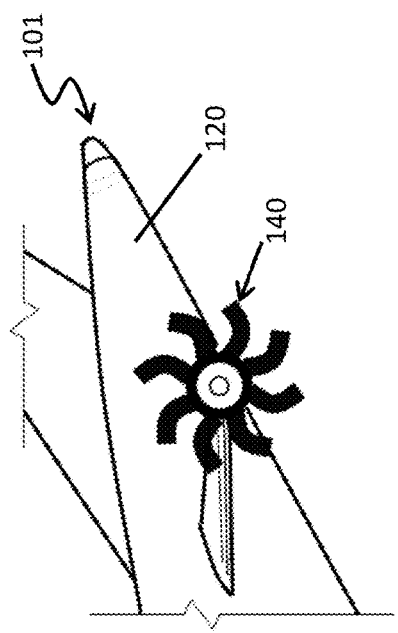
FIG. 2B is a rear view of the aircraft of FIG. 2A with the stowed RAT device in accordance with embodiments.

These and other advantages and features will become more apparent from the following description taken in conjunction with the drawings.

DETAILED DESCRIPTION

As will be described below, a RAT is provided for use with a modern MEE/MEA aircraft and is optimized by being integrated into an on-board hybrid-electric propulsion system.

With reference to FIGS. 1A and 1B, FIGS. 2A and 2B and FIG. 3, an aircraft 101 is provided. The aircraft 101 includes on-wing engine assemblies 110. Each of the on-wing engine assemblies 110 can have, but are not required to have, an absence of thrust-reversers that would normally be present to facilitate a reduction in aircraft 101 velocity during landing. In addition, the aircraft 101 includes a fuselage 120, a hybrid-electric power generation system 130 (see FIG. 3) that is operably disposed in a tail end 121 of the fuselage 120 and ram air turbine (RAT) devices 140. The RAT devices 140 are each coupled with the hybrid-electric power generation system 130, and which are each stowable in the fuselage 120 and deployable to an exterior of the fuselage 120. The RAT devices 140 are each operable in multiple modes given a current flight regime and a current condition of the aircraft 101.

For example, in a case in which the on-wing engine assemblies 110 have an absence of thrust-reversers or insufficient thrust-reversion (i.e., the on-wing engine assemblies 110 lack thrust-reversers entirely or the on-wing engine assemblies 110 have thrust-reversers that are inoperative or insufficient to reduce a velocity of the aircraft 101 alone), each of the RAT devices 140 can be operated as a braking thrust generating propulsor when deployed during a landing of the aircraft 101 and when driven by the hybrid-electric power generation system 130 to reduce a velocity of the aircraft 101. Actually, each of the RAT devices 140 can be operated as the braking thrust generating propulsor when deployed during the landing of the aircraft 101 and when driven by the hybrid-electric power generation system 130 to reduce a velocity of the aircraft 101 whether the on-wing engine assemblies 110 have the absence of thrust-reversers or not. In the latter case, each of the RAT devices 140 can be operated as the braking thrust generating propulsor when deployed during the landing of the aircraft 101 in order to supplement or provide redundancy for the thrust-reversers of the on-wing engine assemblies 110.

In addition, the RAT devices 140 are each operable as a RAT when deployed into an airstream that drives rotations of the RAT from which the hybrid-electric power generation system 130 generates electricity. Also, the RAT devices 140 are each operable as a forward thrust generating propulsor when deployed during take-off or during an engine power-loss event and driven by the hybrid-electric power generation system 130. In these or other cases, the RAT devices 140 are capable of electrically modulating propulsor blade angles to optimally absorb energy from a free air stream to in turn drive rotations of the RAT from which the hybrid-electric power generation system 130 generates electricity. The RAT devices 140 can also electrically modulate propulsor blade angles to optimally create thrust when being operable as a propulsor when deployed and driven by the hybrid-electric power generation system 130. The RAT devices 140 are also capable of electrically modulating the propulsor blades in a reverse pitch direction to generate braking propulsor thrust.

Figure 3:
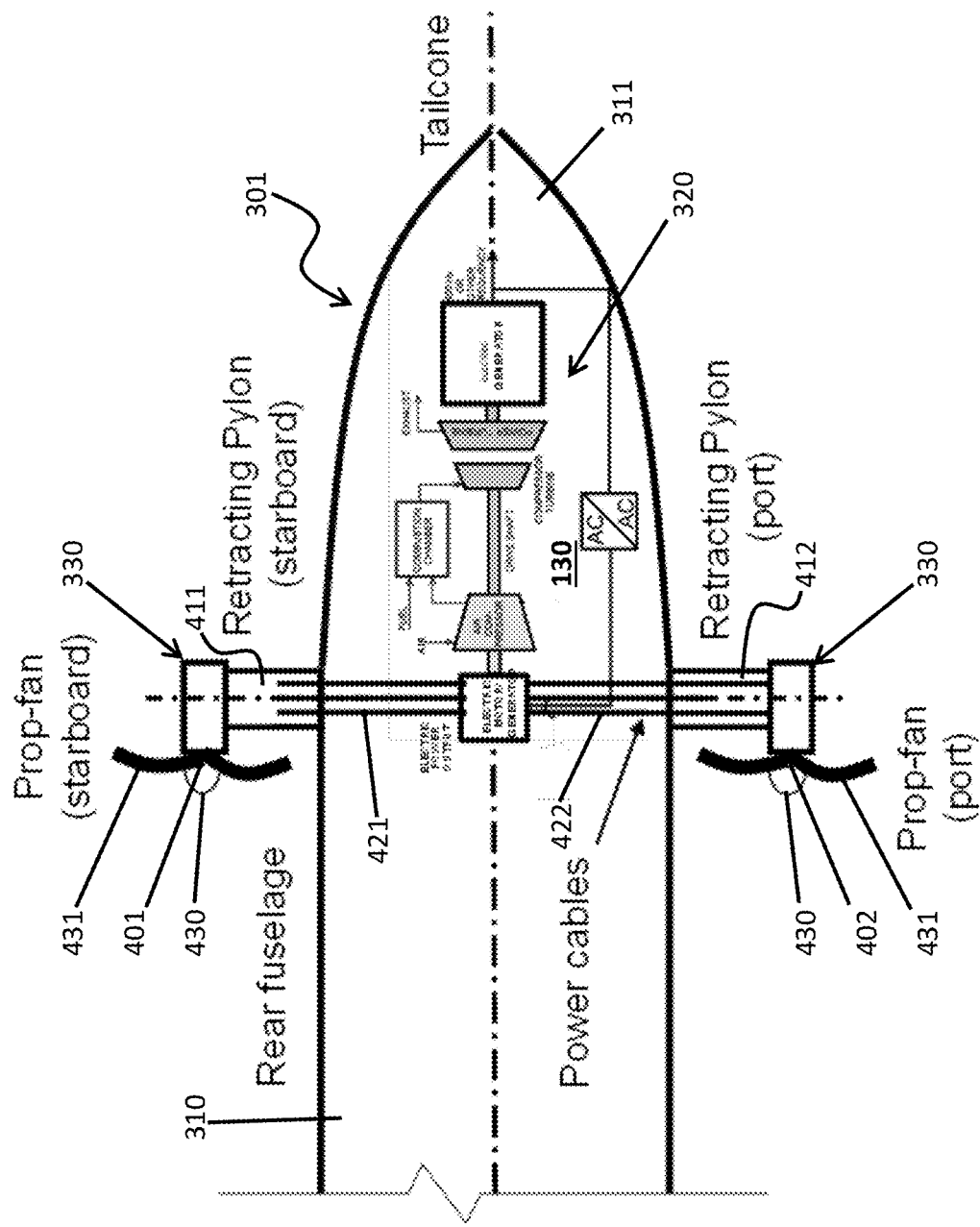
FIG. 3 is a top-down schematic view of a tail end of an aircraft fuselage with deployed RAT devices and a hybrid-electric power generation system in accordance with embodiments.
Figure 4:
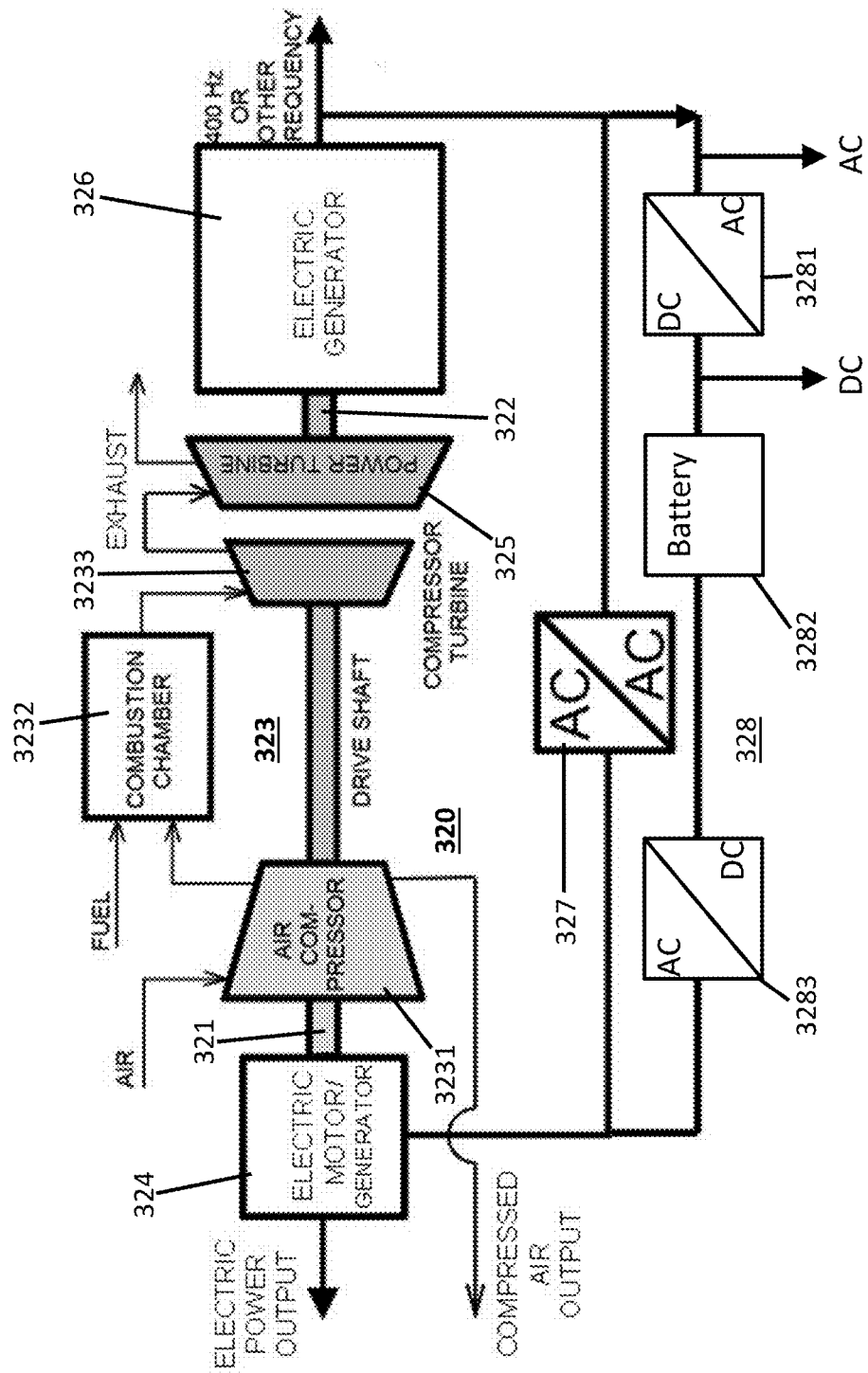
FIG. 4 is an enlarged schematic diagram of the hybrid-electric power generation system of FIG. 3 in accordance with embodiments.

With continued reference to FIG. 3 and with additional reference to FIG. 4, an electricity generation and propulsion system 301 of an aircraft, such as the aircraft 101, is provided. The electricity generation and propulsion system 301 includes a fuselage 310, a hybrid-electric power generation system 320 that is operably disposed in a tail end 311 of the fuselage 310 and a RAT device 330. The hybrid-electric power generation system 320 can be provided as an auxiliary power unit (APU) in the tail end 311 of the fuselage 310. The RAT device 330 is coupled with (i.e., electrically connected with) the hybrid-electric power generation system 320. The RAT device 330 is stowable in the fuselage 310 and is selectively deployable to an exterior of the fuselage 310.

In an exemplary case, such as when there is a power-loss event on the aircraft 101, the RAT device 330 can be operable as a RAT by being selectively deployed into an airstream so that the airstream drives rotations of the RAT from which the hybrid-electric power generation system 320 generates electricity. In another exemplary case, such as during take-off of the aircraft 101 or during an engine power-loss event, the RAT device 330 can be operable as a forward thrust generating propulsor by being selectively deployed and while being driven in a forward rotational direction by the hybrid-electric power generation system 320. In yet another exemplary case, such as during landing of the aircraft 101, the RAT device 330 can be operable as a braking thrust generating propulsor by being selectively deployed with propulsor blades in a reverse pitch direction to thereby generate braking thrust while being driven by the hybrid-electric power generation system 320.

As shown in FIG. 4, the hybrid-electric power generation system 320 includes a first drive shaft 321 and a second drive shaft 322, a gas turbine engine 323 that is disposed on the first drive shaft 321, a motor-generator 324 that is disposed on the first drive shaft 321, a power turbine 325 and an electric generator 326.

The gas turbine engine 323 includes a compressor 3231, a combustor 3232 and a compressor turbine 3233, all of which are operably disposed on the first drive shaft 321. Air is compressed in the compressor 3231 and compressed air output from the compressor 3231 is then provided to the combustor 3231 or bled off for pneumatic/hybrid (electro-pneumatic) systems on-board the aircraft 101. Within the combustor 3232, the compressed air is mixed with fuel and combusted to produce high-temperature and high-pressure working fluid that is expanded in the compressor turbine 3233 to drive the first drive shaft 321 and in turn to drive the compressor 3231 and the motor-generator 324. Due to the compact/lightweight design of the gas turbine engine 323, very high operational rotational speeds can be obtained, which can improve operational efficiency while keeping the overall weight/size to a minimum.

In addition, by providing the motor-generator 324 as an assist for the compressor 3231, the hybrid-electric power generation system 320 can increase a power output when necessary. This, in turn increases the power output of the power turbine 325 and as a result more output power is provided to the electric generator 326.

The power turbine 325 can be a standard wound-field synchronous generator or other generator types (e.g., induction, permanent magnet or switched-reluctance generators). The power turbine 325 is receptive of exhaust from the gas turbine engine 323. The electric generator 326 is drivable by the power turbine 325 via the second drive shaft 322.

The hybrid-electric power generation system 320 can further include an alternating current (AC)/AC converter 327, which is electrically interposed between the motor-generator 324 and the electric generator 326, and a serial formation 328, which is disposed in parallel with the AC/AC converter and which is also electrically interposed between the motor-generator 324 and the electric generator 326 and includes an AC/DC converter 3281, a battery 3282 and a DC/AC inverter 3283. The AC/AC converter 327 can be a solid-state power converter that effectively controls an output speed of the hybrid-electric power generation system 320. The AC/AC converter 327 can be a variable frequency-constant frequency (VF-CF) power converter or a converter of any other suitable architecture.

The electric generator provides electric power for the RAT device 330 as well as electric power for other on-board needs (e.g., electric accessories, etc.). In addition, where the electric power from the electric generator 326 flows through the AC/AC converter 327 to the motor-generator 324, the motor-generator 324 can be used as a starter (reversed electric power flow) during initial engine start. The start can also be powered by the battery 3282 and the DC/AC inverter 3283. To this end, the motor-generator 324 can be provided as an induction and/or a permanent magnet brushless motor that can be used as an inverter-fed electric motor coupled mechanically with the first drive shaft 321.

Any additional electric power generated by the electric generator 326, which is not immediately needed/consumed, can be stored in the battery 328.

It is to be understood that the hybrid-electric power generation system 320 can quickly follow load variations, in seconds instead of in minutes, because a time constant of motor torque control is a fraction of second.

As shown in FIG. 3, the RAT device 330 includes a first RAT device 401 at a starboard side of the fuselage 310 and a second RAT device 402 at a port side of the fuselage 310, respectively, a first retracting pylon 411 and a second retracting pylon 412 and a first power cable 421 and a second power cable 422. The first and second RAT devices 401 and 402 are selectively deployable from respective stowed positions in the fuselage 310 by the first and second retracting pylons 411 and 412, respectively. The hybrid-electric power generation system 320 is electrically connected to the first and second RAT devices 401 and 402 by the first and second power cables 421 and 422, respectively. In addition, each of the first and second RAT devices 401 and 402 includes a propfan 430. The propfan 430 has blades 431 with swept profiles and with adjustable pitch angles (i.e., pitch angles that produce forward thrust and pitch angles that produce reverse thrust). Each of the first and second RAT devices 401 and 402 is operable in a forward rotational direction to generate forward propulsor thrust at an optimal angle to generate forward thrust or in a reverse pitch angle generate braking propulsor thrust.

Figure 5:
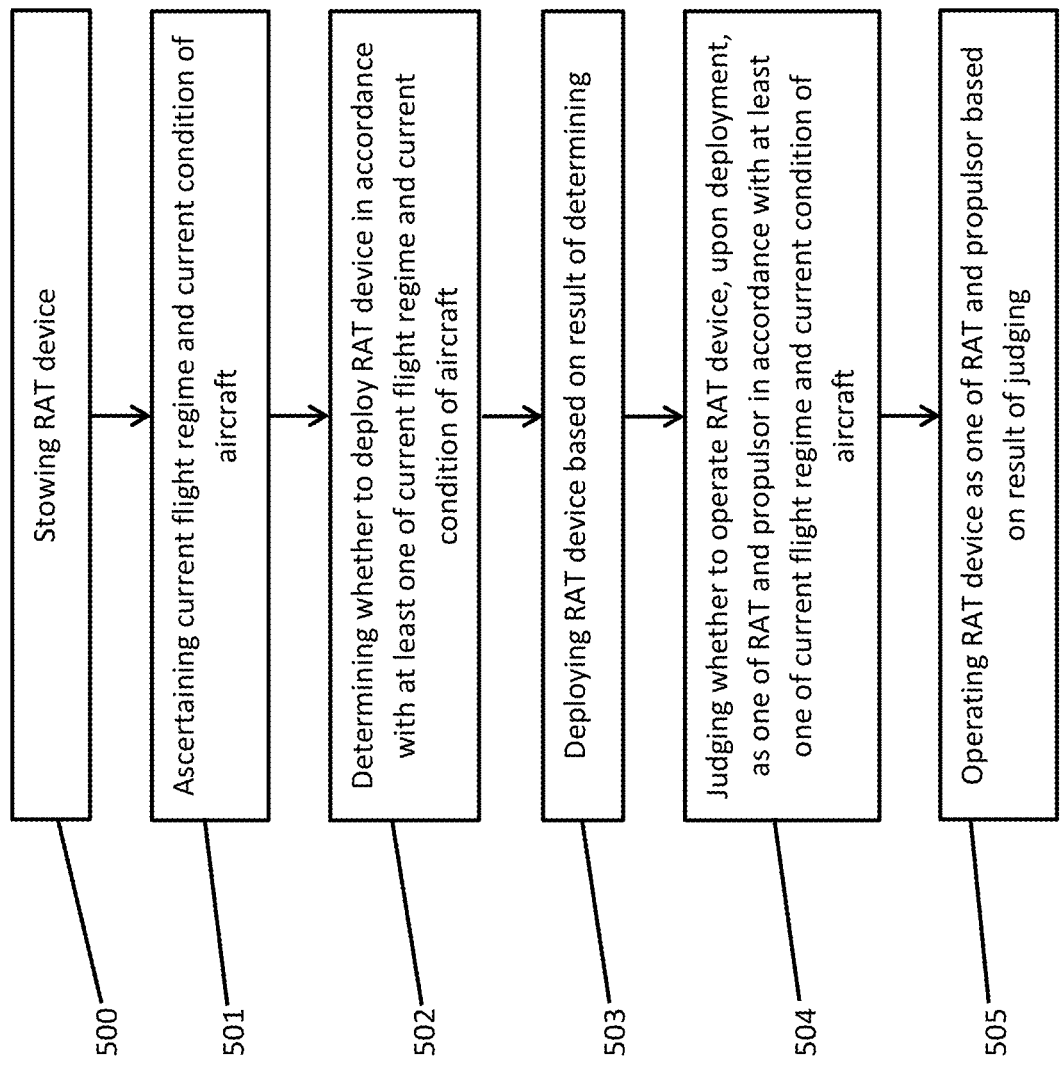
FIG. 5 is a flow diagram of a method of operating an electricity generation and propulsion system of an aircraft in accordance with embodiments.

With reference to FIG. 5, a method of operating an electricity generation and propulsion system of an aircraft, such as the aircraft 101, is provided. As shown in FIG. 5, the method includes initially stowing a RAT device in an aircraft fuselage (500). The method also includes ascertaining a current flight regime and a current condition of the aircraft (501), determining whether to deploy a RAT device from the aircraft fuselage to an exterior of the aircraft fuselage in accordance with at least one of the current flight regime and the current condition of the aircraft (502) and deploying the RAT device from the aircraft fuselage to the exterior of the aircraft fuselage based on a result of the determining (503). In addition, the method includes judging whether to operate the RAT device, upon deployment, as one of a RAT and a propulsor in accordance with at least one of the current flight regime and the current condition of the aircraft (504) and then operating the RAT device as the one of the RAT and the propulsor based on a result of the judging (505).

In accordance with embodiments, the result of the determining of operation 502 can be affirmative to deploy in an event the current condition of the aircraft is a power-loss event and the result of the judging of operation 504 is that the operating of operation 505 includes operating the RAT device as the RAT, upon deployment, during the power-loss event. Likewise, the result of the determining of operation 502 can be affirmative to deploy in an event the current flight regime of the aircraft is take-off or an engine power-loss event and the result of the judging of operation 504 is that the operating of operation 505 includes operating the RAT device as a forward thrust generating propulsor, upon deployment, during the take-off or during the engine power-loss event. Similarly, the result of the determining of operation 502 can be affirmative in an event the current flight regime of the aircraft is landing and the result of the judging of operation 504 is that the operating of operation 505 includes operating the RAT device as a braking thrust generating propulsor, upon deployment, during the landing.

Technical effects and benefits of the present disclosure are the provision of an electric-hybrid propeller fan that is stowable in an aircraft and has the following capabilities and advantages: a capability to augment thrust power during critical flight phases (e.g., takeoff/climb, etc.); a capability for independent operation of the electric propfans using electrical power from the electric generator; the provision of electric fans providing thrust reverse; the provision of a high fan bypass ratio with smaller gas turbine cores required for cruise sizing; a capability to "freewheel" the electric propfans in a "RAT"-style mode to help turn electric motor and provide electric power; a compact EM-driven contra-rotating PM motor-driven rotary propulsion system and a capability to achieve fast response to sudden fluctuations (fast transients) in load. In addition, at high ambient temperature conditions, an output of a gas turbine engine tends to decrease, but the electric motor can increase the rotation speed and compensate for the power drop. The RAT has a lower weight and smaller volume envelope (minimum number of parts) compared to using an additional battery or a separate flywheel. A high power-density electric motor can provide high propulsive force/torque (through reduction gearboxes). The electric-hybrid propeller fan is compatible with advanced modern MEA/MEE/Hybrid architectures and with clean technologies applications for advanced aircraft systems.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An electricity generation and propulsion system of an aircraft, comprising:
    a fuselage;
    a hybrid-electric power generation system operably disposed in the fuselage; and
    a ram air turbine (RAT) device, which is coupled with the hybrid-electric power generation system, and which is stowable in the fuselage and deployable to an exterior of the fuselage,
    the RAT device being operable as a RAT when deployed into an airstream that drives rotations of the RAT from which the hybrid-electric power generation system generates electricity, and
    the RAT device being operable as a propulsor when deployed and driven by the hybrid-electric power generation system.

2. The hybrid-electric propulsion system according to claim 1, wherein the RAT device is deployed during a power-loss event to be operable as the RAT.

3. The hybrid-electric propulsion system according to claim 1, wherein the RAT device is deployed during take-off or an engine power-loss event to be operable as a forward thrust generating propulsor.

4. The hybrid-electric propulsion system according to claim 1, wherein the RAT device is deployed during landing to be operable as a braking thrust generating propulsor.

5. The hybrid-electric propulsion system according to claim 1, wherein the hybrid-electric power generation system is provided as an auxiliary power unit in a tail end of the fuselage.

6. The hybrid-electric propulsion system according to claim 1, wherein the hybrid-electric power generation system comprises:
    first and second drive shafts;
    a gas turbine engine disposed on the first drive shaft;
    a motor-generator disposed on the first drive shaft;
    a power turbine, which is receptive of exhaust from the gas turbine engine; and
    an electric generator, which is drivable by the power turbine via the second drive shaft.

7. The hybrid-electric propulsion system according to claim 6, wherein the hybrid-electric power generation system further comprises:
    an alternating current (AC)/AC converter electrically interposed between the motor-generator and the electric generator; and
    a converter, a battery and an inverter in parallel with the AC/AC converter and electrically interposed between the motor-generator and the electric generator.

8. The hybrid-electric propulsion system according to claim 1, wherein the RAT device comprises:
    first and second RAT devices at starboard and port sides of the fuselage, respectively;
    first and second retracting pylons by which the first and second RAT devices are selectively deployable, respectively, from respective stowed positions; and
    first and second power cables by which the hybrid-electric power generation system is electrically connected to the first and second RAT devices, respectively.

9. The hybrid-electric propulsion system according to claim 8, wherein each of the first and second RAT devices comprises a propfan having blades with swept profiles.

10. The hybrid-electric propulsion system according to claim 8, wherein each of the first and second RAT devices is operable in a forward rotational direction to generate forward propulsor thrust.

11. The hybrid-electric propulsion system according to claim 8, wherein each of the first and second RAT devices is operable in a reverse pitch angle to generate braking propulsor thrust.

12. A method of operating an electricity generation and propulsion system of an aircraft, the method comprising:
    ascertaining a current flight regime and a current condition of the aircraft;
    determining whether to deploy a RAT device in accordance with at least one of the current flight regime and the current condition of the aircraft;
    deploying the RAT device based on a result of the determining;
    judging whether to operate the RAT device, upon deployment, as one of a RAT and a propulsor in accordance with at least one of the current flight regime and the current condition of the aircraft; and
    operating the RAT device as the one of the RAT and the propulsor based on a result of the judging.

13. The method according to claim 12, wherein the RAT device is electrically connected with a hybrid-electric power generation system of the aircraft.

14. The method according to claim 12, wherein the RAT device comprises first and second RAT devices at starboard and port sides of the aircraft, respectively.

15. The method according to claim 12, further comprising:
stowing the RAT device in an aircraft fuselage; and
deploying the RAT device from the aircraft fuselage to an exterior of the aircraft fuselage.

16. The method according to claim 12, wherein:
the result of the determining is affirmative in an event the current condition of the aircraft is a power-loss event, and
the result of the judging is that the operating comprises operating the RAT device as the RAT, upon deployment, during the power-loss event.

17. The method according to claim 12, wherein:
the result of the determining is affirmative in an event the current flight regime of the aircraft is take-off or in an event the current condition of the aircraft is an engine power-loss event, and
the result of the judging is that the operating comprises operating the RAT device as a forward thrust generating propulsor, upon deployment, during the take-off or the engine power-loss event.

18. The method according to claim 12, wherein:
the result of the determining is affirmative in an event the current flight regime of the aircraft is landing, and
the result of the judging is that the operating comprises operating the RAT device as a braking thrust generating propulsor, upon deployment, during the landing.

19. An aircraft, comprising:
on-wing engine assemblies having an absence of thrust-reversers;
a fuselage;
a hybrid-electric power generation system operably disposed in the fuselage; and
ram air turbine (RAT) devices, which are each coupled with the hybrid-electric power generation system, and which are each stowable in the fuselage and deployable to an exterior of the fuselage,
the RAT devices each being operable as a braking thrust generating propulsor when deployed during a landing and driven by the hybrid-electric power generation system.

20. The aircraft according to claim 19, wherein:
the RAT devices are each operable as a RAT when deployed into an airstream that drives rotations of the RAT from which the hybrid-electric power generation system generates electricity, and
the RAT devices are each operable as a forward thrust generating propulsor when deployed during take-off or during an engine power-loss event and driven by the hybrid-electric power generation system.

* * * * *